United States Patent [19]

Stokes

[11] 4,274,851

[45] Jun. 23, 1981

[54] GAS RECOVERY OF SULPHUR HEXAFLUORIDE

[75] Inventor: Anthony D. Stokes, Sydney, Australia

[73] Assignee: The University of Sydney, Sydney, Australia

[21] Appl. No.: 25,322

[22] Filed: Mar. 28, 1979

[51] Int. Cl.³ .............................................. F25J 3/08
[52] U.S. Cl. .................... 62/40; 200/148 E; 62/12; 62/45
[58] Field of Search ................... 62/45, 46, 47, 50, 40; 200/149 A, 148 E, 148 B

[56] References Cited

U.S. PATENT DOCUMENTS

| | | | |
|---|---|---|---|
| 3,362,174 | 1/1968 | Carbonell et al. | 62/40 |
| 3,661,542 | 5/1972 | Collins | 62/45 |
| 3,793,499 | 2/1974 | Wagner et al. | 200/148 E |
| 4,127,163 | 11/1978 | Reti | 62/12 |

*Primary Examiner*—Norman Yudkoff
*Attorney, Agent, or Firm*—DeLio and Montgomery

[57] ABSTRACT

A gas recovery method and apparatus for the recovery and storage of a gas from a gas enclosure or circuit particularly for the recovery of sulphur hexafluoride ($SF_6$) from the arc chamber of a high voltage/current circuit breaker. A gas bottle is connected via quick connect coupling and a non-return valve to the gas circuit or enclosure. The gas bottle is immersed in a liquid nitrogen environment in a Dewar flask thereby generating a self pumping action as the sulphur hexafluoride liquifies (or solidifies) within the gas bottle due to the temperature of the liquid nitrogen ($-196°$ C.) being well below the phase change temperature of the sulphur hexafluoride over the range of encountered vapor pressures. When the gas has been recovered, it is stored in the gas bottle which is returned to ambient temperature by removal from the liquid nitrogen and/or by immersion in a heated bath. The gas bottle is reconnected to the gas circuit when recharging of the circuit with the recovered $SF_6$ is required.

8 Claims, 3 Drawing Figures

| Symbol | Description |
|---|---|
| Ⓢ | PRESSURE GAUGE |
| Ⓣ | THERMOMETER |
| ⋈ | SHUT OFF VALVE |
| ◇ | ONE WAY VALVE |
| (symbol) | RELIEF VALVE |
| (symbol) | REGULATOR |
| ◇ | PARTICLE FILTER |
| ○⊢○ | QUICK CONNECT COUPLING |
| (symbol) | 4 PORT 3 POSITION HAND OPERATED VALVE |
| - - - - - - - | PILOT AIR SUPPLY |
| (symbol) | MOTOR DRIVEN VACUUM PUMP |
| ⌣ | FLEXIBLE CONNECTION |
| (symbol) | 2 PORT 2 POSITION AIR OPERATED VALVE |
| (symbol) | 2 PORT 2 POSITION SOLENOID OPERATED VALVE |
| (symbol) | DOUBLE ACTING AIR OPERATED PISTON |
| — · — · — | ELECTRICAL CONNECTION |

(LEGEND)

FIG. 3.

GAS RECOVERY OF SULPHUR HEXAFLUORIDE

BACKGROUND OF THE INVENTION

This invention relates to gas recovery and is more specifically concerned with the recovery of gases from enclosures containing equipment which has to operate in a gaseous environment other than air.

There are many areas of technology in which fairly large equipment is required to operate in an atmosphere of a particular gas. One such area is the electrical supply industry where, for example, electric circuit breakers are often required to operate in an atmosphere of sulphur hexafluoride ($SF_6$) gas.

Sulphur hexafluoride gas is relatively expensive and it is normally recovered and stored if equipment which normally works in the gas is to be serviced or repaired. As the equipment may be sited in remote areas, a portable assembly is used to recover the gas and to recharge the equipment with the gas after the equipment has been serviced or repaired. Such assembly comprises a large pump and a storage vessel normally mounted on a vehicle. The amount of gas to be recovered may be 200 kg or more, and, as it is normally at pressures between 4 and perhaps 20 atmospheres in the enclosure, the pump used must have a high capacity and the assembly is therefore a cumbersome and expensive piece of equipment, which is used only intermittently.

SUMMARY OF THE INVENTION

The present invention seeks to amend the need for high capacity pumps by providing a gas recovery apparatus comprising at least one vessel connectable to an enclosure or circuit from which a gas is to be recovered and means for holding the vessel at a temperature below that at which the gas is transformed from its vapour phase to a liquid or solid phase.

The apparatus of the invention has the advantage that the use of a high pressure pump is avoided altogether and the gas storage vessels are reduced in size, perhaps four-fold. The conversion of the recovered gas to its liquid phase produces a drop in pressure which induces its own pumping action so that the gas can be rapidly withdrawn from the enclosure or circuit by way of a coupling and, when cold, stored at a pressure at or beneath atmospheric pressure.

The cooling arrangement conveniently comprises a bath of liquid nitrogen. The vessel may take the form of a stainless steel or aluminium cylinder mounted in the bath. Liquid nitrogen has the advantage that air is not liquified when contained in vessels at temperatures just above the boiling point of the liquid nitrogen. The recovered gas may therefore be separated from air which may have contaminated it through leakage, by applying a vacuum pump to the vessel after the gas has been solidified in the vessel.

The invention is particularly well-suited to recovering sulphur hexafluoride from electrical circuit breakers and other such equipment. Sulphur hexafluoride is solid at the temperature of liquid nitrogen ($-196°$ C.) and liquid nitrogen is readily available as a cheap safe, refrigerant. The apparatus can be stored at a maintenance depot for servicing a number of circuit breakers and temporarily transported to any breaker which requires servicing.

According to the invention there is provided a gas recovery apparatus comprising at least one vessel connectable to an enclosure or circuit from which a gas is to be recovered such that the gas is enabled to flow from the enclosure or circuit into the vessel and means for holding the vessel at a temperature below that at which the gas is transformed from its vapour phase to its liquid phase or to its solid phase thereby storing the gas in the vessel.

According to the invention there is further provided a method of recovering gas from an enclosure or circuit, the method comprising connecting to the closure or circuit a gas receiving vessel which is held at a temperature below that at which the gas is transformed from its vapour phase to its liquid phase or to its solid phase and storing the gas in the receiving vessel.

BRIEF DESCRIPTION OF THE DRAWINGS

The invention will now be described in more detail in a preferred embodiment, by way of example, with reference to the accompanying drawings, in which:

FIG. 3 is a code chart which identifies the legends employed in FIG. 2.

DESCRIPTION OF THE PREFERRED EMBODIMENT

Figure 1:
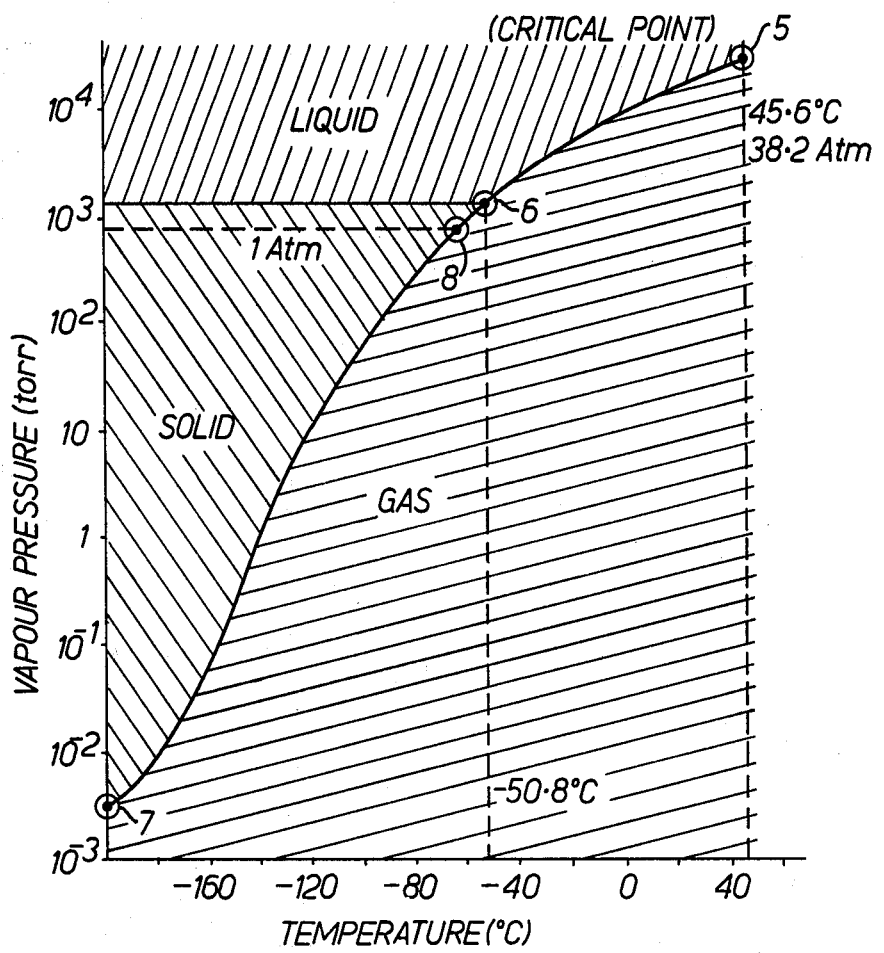
FIG. 1 is a graph showing the vapour pressure of sulphur hexafluoride as a function of its temperature.

As is shown in the curve of FIG. 1, between a critical point 5 and a point 6, sulphur hexafluoride is either at a liquid phase or a gaseous phase dependent on its temperature and pressure. Between the points 6 and 7 sulphur hexafluoride exists either in its gaseous phase or its solid phase in accordance with the temperature and pressure. Point 8 on the curve of FIG. 1 shows that at temperatures beneath $-60°$ C. the sulphur hexafluoride exists in its solid state at atmospheric pressure.

It will be seen from the curve that at a temperature of $-196°$ C., which is the temperature of liquid nitrogen, sulphur hexafluoride exists in a solid phase unless its pressure is reduced below about $10^{-2.5}$ Torr. Bearing in mind that one Torr is equal to 1/760th of an atmosphere, this is almost a pure vacuum condition. As with most gases, the conversion of sulphur hexafluoride from its gaseous to its solid phase is accompanied by a very great reduction in volume, exceeding 100:1 at one atmosphere pressure.

Figure 2:
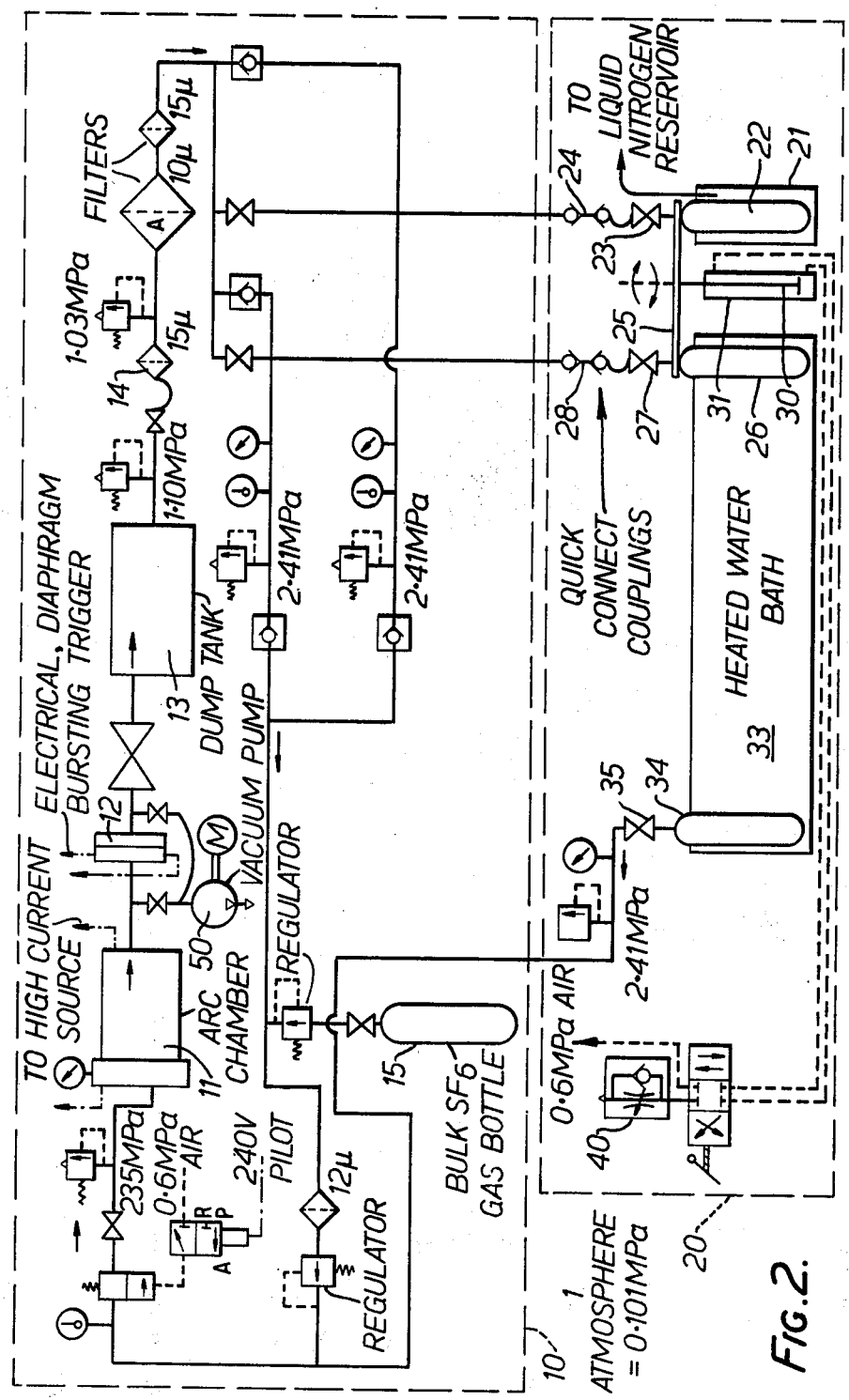
FIG. 2 is a schematic circuit diagram of apparatus for recovering sulphur hexafluoride from a circuit breaker, the diagram showing also the sulphur hexafluoride gas circuit for the breaker.

Referring now to the apparatus as shown schematically in FIG. 2 and having the elements identified by the legends encoded in FIG. 3:

FIG. 2 shows, within the broken line 10 equipment associated with a gas-filled circuit breaker using sulphur hexafluoride gas. This equipment comprises an arc chamber 11 from which sulphur hexafluoride gas travels through a fast opening valve 12 to a dump tank 13. Typically, the gas is at a pressure of four atmospheres and the arc chamber and its surrounding enclosure together contain about 8 liters of gas, although this varies with design. Gas from the dump tank is cleaned by passage through filters 14 before being recycled back to the arc chamber with additional gas provided for topping-up purposes from a gas bottle 15.

The equipment also includes manual valves, one-way valves, meters, regulators and additional filters, as identified by the legend encoding of FIG. 3. These elements form a normal part of most fluid circuits and are not therefore detailed herein.

The apparatus for recovering sulphur hexafluoride from the circuit shown in FIG. 2 is contained within the broken outline 20. It comprises dewar flask 21 containing a stainless steel vessel 22 connected by a valve 23 and a quick-connector coupling 24 to the gas circuit of the equipment and apparatus 10. The vessel 22 is carried at one end of a yoke 25 which carries at its other end a second similar vessel 26 also connected by a valve 27 and a quick-release coupling 28 to the gas circuit of the breaker. The yoke 25 can be raised and lowered by a double-acting piston 30 operating in a cylinder 31 in which the piston can rotate when raised.

The vessel 26 is partially immersed in a heated water tank 33 which contains a further vessel 34 containing sulphur hexafluoride and connected through a valve 35 which can be opened to provide a rapid pressure build up of sulphur hexafluoride gas to the circuit breaker enclosure as it by-passes the regulators which control the gas flow into the circuit from the vessel 26.

A pressure switch 40 and associated 4-part, 3-position hand operated valve controlling a compressed air supply is used to provide compressed air as the working fluid to the cylinder 31.

A large dewar flask of liquid nitrogen (not illustrated) may also be provided as a liquid nitrogen reservoir.

When the sulphur hexafluoride gas is to be recovered from the circuit breaker enclosure the vessel 22 is connected to the gas circuit by means of the quick connector couplings and operation of the non-return valve. The sulphur hexafluoride gas from the gas circuit of the breaker flows quickly into the stainless steel vessel 22 where it liquifies and quickly solidifies. A pumping rate of approximately 400 grms per square meter of cooled cylinder area is maintained provided the connecting pipe-work can deliver this quantity of gas. The gas in the circuit is rapidly converted into liquid and then solid sulphur hexafluoride in the cooled vessel 22. It is important that the neck of the vessel is not held at temperatures at which it could be choked by $SF_6$ snow formation as it enters the vessel 22. Also the $SF_6$ should preferably pass from a gaseous phase to a liquid phase in the vessel 22, before solidifying, so that it collects in the base of the vessel 22 and leaves the vessel walls free of any insulation caused by solid $SF_6$ build up. The pressure within the vessel falls to very low values and the consumption of nitrogen is approximately one liter per kg of sulphur hexafluoride gas recovered. Air which may have seeped into the gas circuit is not liquified at the temperature of liquid nitrogen, and can be evacuated by a vacuum pump normally provided but not shown.

When the sulphur hexafluoride has been recovered, valve 23 is closed and the circuit breaker enclosure can then be opened up for maintenance or other work to be carried out.

When necessary work has been completed, the enclosure is evacuated by means of the vacuum pump 50 provided and the system is recharged with sulphur hexafluoride gas. This gas may be obtained by raising, turning and then lowering the yoke 25 so that the vessel 22 is located in the heated bath 33 in the position previously occupied by vessel 26. Vessel 22 thus becomes vessel 26, as shown in FIG. 2, and as such it is heated to cause the previously recovered sulphur hexafluoride to be discharged into the gas circuit enclosed by the dotted line 10. Vessel 34 also may be used to recharge the gas circuit quickly, if required, as its connections by-pass the regulators.

The vessel 22 and 26 can be positionally interchanged after raising the piston, by rotating the yoke, as above described. Alternatively cylinder 22 can be used alone if heated by electric heaters when it is required to recharge the equipment with the previous recovered gas.

In such case the apparatus would comprise a single liquid nitrogen flask 21 containing an electrical heater and the vessel 22. Connections would allow the liquid nitrogen to be fed between the flask and a reservoir of liquid nitrogen. Control circuitry would enable the vessel 22 to be cooled when sulphur hexafluoride was to be recovered and heated when it was to be fed back into a breaker connected temporarily to the apparatus. The apparatus could be portably mounted.

From the above description it will be appreciated that the gas recovery apparatus of the invention is cheap to make, has low running costs, is very much more compact than currently available gas recovery apparatus, and is perhaps one quarter of the size. Because there are few moving parts, there is also a lesser risk of damage. Although care has to be taken when handling liquid nitrogen, it is a cheap commodity and requires no special precautions to be taken other than those associated with low temperature liquids and which are fairly well known at this time.

Although the invention has been above described in the context of removing hexafluoride gas from an electric circuit breaker, it is to be understood that this is only one application of the invention and that it has broader significance. Thus, the invention may be applied to the recovery of any gas from any device, using the concept of holding the vessel which is used in recovery of the gas at a temperature beneath that at which the recovered gas is transformed from its vapour phase to a liquid or solid phase.

It has been found that the apparatus for carrying out the invention may be even more economically provided by using aluminium vessels instead of stainless steel vessels. Aluminium vessels are commercially available and are cheaper than stainless steel vessels. Additionally, if the invention is being applied to the recovery of sulphur hexafluoride gas from a high voltage circuit breaker and the servicing time on the breaker is likely to be extensive, the liquid or solid phase gas stored in the vessel may be allowed to slowly return to room or ambient temperature without the aid of the aforementioned heating bath. Under such circumstances the natural heat transfer from the ambient to the liquified or solidified gas may be sufficient over the service time to bring the stored gas back to the ambient temperature and hence at appropriate pressure for that temperature.

I claim:

1. A gas recovery apparatus for recovering sulphur hexafluoride gas from the switching chamber of a high voltage circuit breaker, said recovery apparatus comprising:
    a first high pressure gas supply line interconnecting the switching chamber with a quick-connect gas coupling;
    a gas storage vessel having a closure valve connectable to the quick-connect gas coupling;
    cryogenic means to reduce the temperature of the gas storage vessel below the phase transition temperatures of the sulphur hexafluoride gas in the range of pressures from the switching chamber pressure of the gas to almost pure vacuum pressure under cryopumping conditions set up upon opening of the closure valve, said cryogenic means including a dewar flask containing liquid nitrogen at atmospheric pressure;

means to ensure said closure valve and the inlet to the gas storage vessel are both maintained at another temperature which is always in excess of said phase transition temperatures;

a heating station for heating the stored gas in the gas storage vessel;

means to effect recharging of the switching chamber with stored gas from the heated storage vessel in the heating station via a second highpressure line, and, means to interchange the gas storage vessel between the cryogenic means and the heating station, the interchange means including a carrier supporting the gas storage vessel and means actuable to lift the carrier and hence raise the vessel from the cryogenic means or the heating station and to generate movement of the carrier in order to effect the interchange.

2. Gas recovery apparatus as claimed in claim 1 wherein the carrier is a yoke and there is provided a gas storage vessel at opposite sides of the yoke such that when one vessel is in the dewar flask the other is in the heating station.

3. A gas recovery apparatus as claimed in claim 1 wherein the heating station comprises a heatable water bath into which the said interchange of the gas storage vessel or vessels may be effected, thereby to set up a rapid heat exchange relationship between the stored phase-changed gas and the water bath via the respective gas storage vessels to return the gas at least to ambient temperature.

4. A gas recovery apparatus as claimed in claim 1 wherein the heating station comprises an atmospheric ambient storage area in which the said interchange of the gas storage vessel or vessels may be effected thereby to set up a slow heat exchange relationship between the stored phase-changed gas and the atmospheric ambience via the respective gas storage vessel or vessels to return the gas to ambient temperature.

5. A gas recovery apparatus as claimed in claim 1 wherein the vessel or vessels is or are constructed substantially of aluminium.

6. A gas recovery apparatus as claimed in claim 1 wherein contaminating gases which have not undergone a phase change from their gaseous state are removed from the gas storage vessel or vessels by vacuum pump means.

7. A gas recovery apparatus as claimed in claim 1 wherein the second gas supply line includes at least one regulator valve and wherein a further vessel containing gaseous sulphur hexafluoride to be delivered to the chamber is provided, said further vessel being connectable to the chamber in such a way as to by-pass the regular valve.

8. A gas recovery apparatus as claimed in claim 1 wherein the vessel or vessels is or are constructed substantially of aluminum or of a stainless steel.

* * * * *